Aug. 14, 1962 B. KOOP 3,049,597

TELEPHONE STERILIZER

Filed July 1, 1957

INVENTOR.
Brent Koop

BY Barnes & Seed

Attorneys 3,049,597
Patented Aug. 14, 1962

3,049,597

TELEPHONE STERILIZER

Brent Koop, 11315 86th Ave., North Surrey, British Columbia, Canada, assignor of one-third to John C. Tapio and one-third to Josephine A. Koop, both of North Surrey, British Columbia, Canada Filed July 1, 1957, Ser. No. 668,987
6 Claims. (Cl. 179—185)

This invention relates to a sterilizer for the mouthpiece of telephones, and particularly a sterilizer employing as the sterilizing agent rays and ozonic gases originating from an ultra violet or other like or suitable lamp. For its general object the invention proposes to provide a handset for telephones in which the lamp is carried by the mouthpiece thereof as a permanent adjunct to the handset, and which may be used with equal effectiveness either on the handset of a wall-type telephone or that of a desk or French-type telephone.

The invention is one in which the lamp is contained in a normally open electric circuit completed by a switch which is actuated automatically in response to the physical act of hanging the handset upon the wall-carried complementing box, or placing the same upon the telephone base, as the case may be. The invention has the further, and important object of providing a sterilizer in which said switch is carried by the handset and is operable by hand so that a user may, if desired, actuate the same by hand when the handset is off the base or the hook.

With yet additional objects and advantages in view which, with the foregoing, will appear and be understood in the course of the following description and claims, the invention consists in the novel construction and in the adaptation and construction of parts hereinafter described and claimed.

The sterilizing lamp which the present invention employs is designated by the numeral 10 and desirably is a ring-shaped miniature of the tube-type lamp used in many fluorescent lighting fixtures, and namely one filled with gas and carrying two exposed contacts by which electric current is passed through the body of contained gas, in this instance, an ozoning gas. The contacts are desirably in the form of parallel prongs 11, shown by dotted lines in FIG. 3, extending perpendicular to the plane occupied by the tubular ring.

Figures 1, 2, 4:
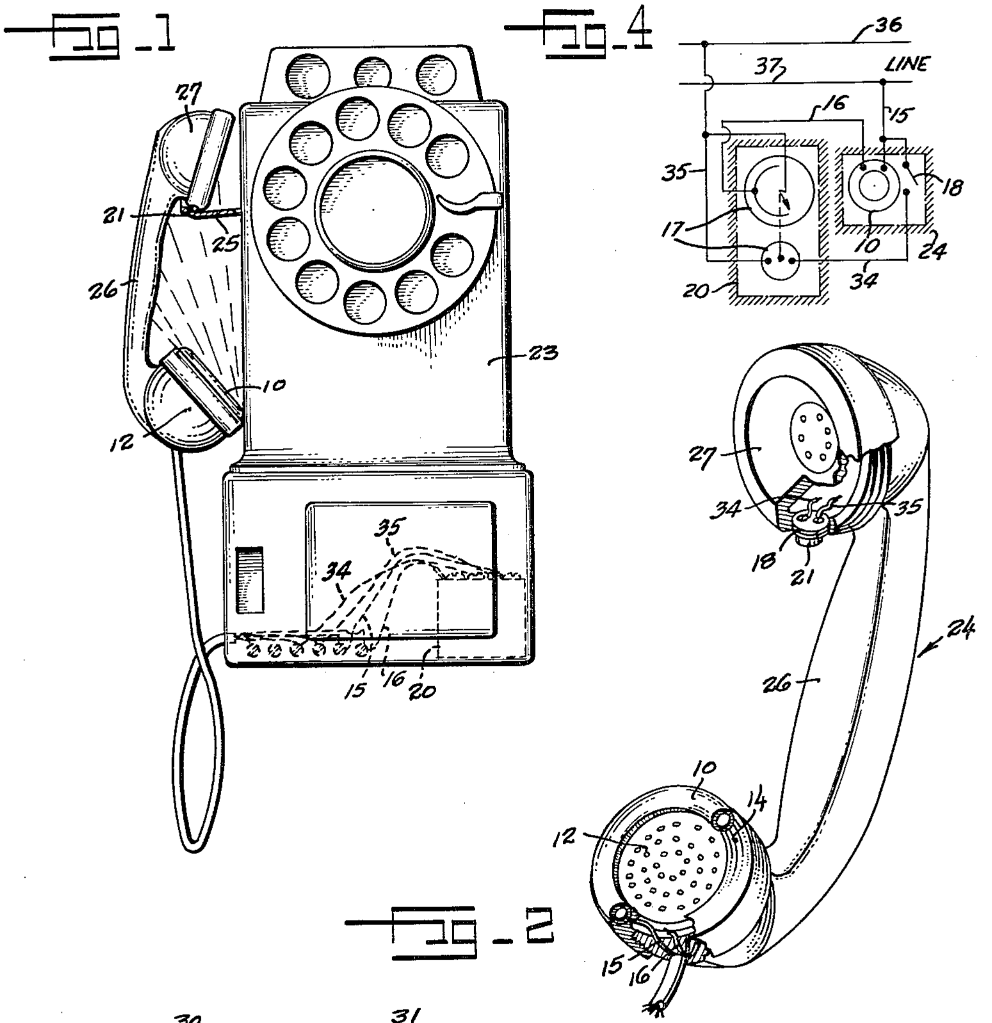
FIGURE 1 is a front elevational view illustrating a wall-type telephone, having a sterilizing system constructed in accordance with the teachings of the present invention.
FIG. 2 is a perspective view of the handset for said wall-type telephone, with parts thereof broken away and shown in section.
FIG. 4 is a diagram indicating the electric circuitry for the invention.

According to the present invention the mouthpiece 12 of the telephone handset has formed in the perforated face, and in surrounding relation to the perforated portion thereof, a fairly shallow channel 14 formed as the mating complement of said tube. Exposed to the floor of said channel are two sockets (not shown) into which the prongs 11 are adapted to be plugged, and connecting with these sockets so as to establish contact with the prongs are electric wires 15 and 16 contained in a normally incomplete electric circuit completed by the activation of a normally inactive electric timer switch 17 which is caused to be energized upon the closing of a normally open switch 18. The timer switch is housed in a box 20 fixedly mounted at a point remote to the handset. Switch 18 is carried by the handset and is or may be comprised of a micro-switch closed by moderate pressure upon an activating button 21. In FIG. 4 I designate current as being drawn from line wires 36 and 37, passing by wires 34 and 35 through an activator element of the timer 17 upon a closing of the switch 18. The timer is or may be of the spring-loaded type, and completes a circuit independent of the circuit 37—15—18—34—35—36 upon a closing of said latter circuit. This independent circuit passes current from line wires 36 and 37 through the tube 10.

Upon reaching the end of the time interval for which the timer is set the tube circuit is de-energized. Upon opening the switch 18 the timer spring acts to re-set the timer so that the circuit through the tube will be again completed upon a subsequent closing of the switch 18.

First considering the wall telephone 23 shown in FIG. 1 and the perspective illustration in FIG. 2 of the handset 24 therefor, it will be seen that the switch 18 is carried by the ear-piece 27 of the handset, being located such that the button 21 is exposed to the underside, and which is to say in a position such that when the handset is hung upon the hook of the wall telephone said button will bear upon the lever arm 25 of said hook and be responsively depressed by the hanging weight of the handset. From an inspection of FIG. 1 it will be apparent that the rays of the lamp, in addition to sterilizing the mouth-piece, are projected onto the handle portion 26 and the ear-piece 27. This occurs from the fact that the plane occupied by the mouth of the mouth piece converges both with respect to the plane of the handle and the plane in which the receiving face of the ear piece lies, such as to expose both the handle and said receiving face to rays emanating from the tube 10.

Figure 3:
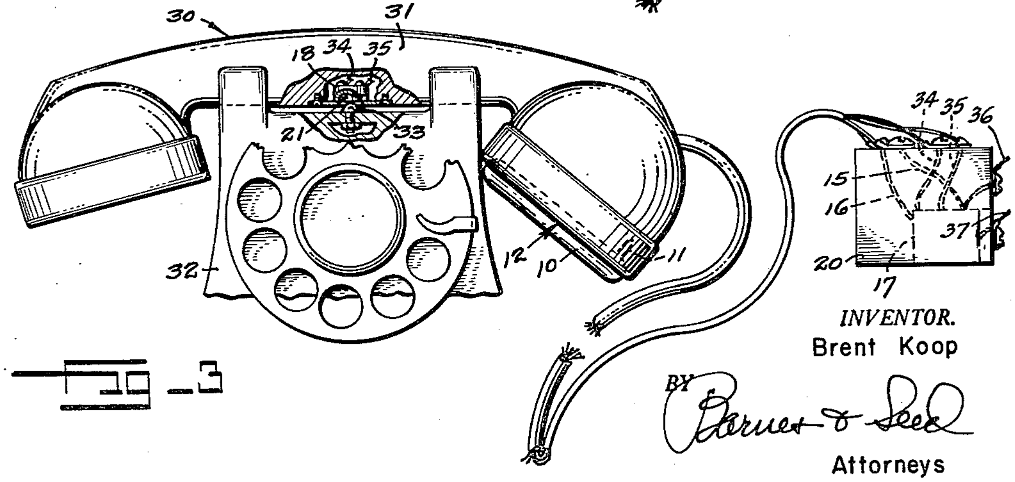
FIG. 3 is a fragmentary elevational view of a French-type telephone embodying teachings of the present invention.

In respect of the desk-type telephone illustrated in FIG. 3, with the handset here designated by 30, the switch 18 is carried by the handle part 31 and there is provided upon the telephone base 32 a modular element 33 which acts to depress the button of said switch when the handset is cradled upon the base.

From the foregoing it will be seen that the switch 18 is closed by the act of replacing the handset upon the telephone, whether the latter be of the wall type shown in FIG. 1 or the desk type shown in FIG. 3. The sterilizing lamp 10 thereupon becomes energized and continues to emit rays throughout the period of time for which the electric timer, or other functioning counterpart thereof, is set, whereupon the same is de-energized. Upon removing the handset to use the telephone, the timer becomes re-set so that the lamp will again perform its sterilizing function in a repeat cycle of operation when the handset is placed upon the hook or cradled upon the base, as the case may be.

It is recognized that both the mouth-piece and the ear-piece of a telephone handset, or which is to say the surface components thereof, are threadably applied to the handset. The present invention, in compensation thereof, desirably provides apertures through these threaded pieces which, when properly registered, give access for the prongs 11 in the instance of the lamp, and for like or similar plug-in prongs formed upon the switch 18 when the latter is applied to the ear-piece as distinguished from the handle. I have not shown this apertured arrangement in order that the illustration may be simplified.

The invention should be clear from the foregoing description of my illustrated preferred embodiments. Changes in the details of construction can be resorted to without departing from the spirit of the invention and it is accordingly my intention that no limitations be implied and that the hereto annexed claims be given the broadest interpretation to which the employed language fairly admits.

What I claim is:

1. In combination with a telephone handset of the type providing a mouth piece at one end and an ear piece at the other end, a normally inactive electric sterilizing lamp carried by the mouth piece in such a position that, when activated, the rays of the lamp will be projected on the mouth piece of said handset, a normally incomplete electric circuit including said electric device, and a switch for completing said circuit carried by the handset in a position conveniently engaged by the finger of a person's hand holding the handset.

2. The structure recited in claim 1, and a mounting on which the handset is placed when the handset is not in use provided with means so associated with the switch as to actuate the latter and complete the electric circuit automatically by the act of placing the handset upon the mounting.

3. In a telephone handset, a handle with ear and mouth pieces at its opposite ends, the plane of the mouth of said mouth piece being steeply inclined relative to the handle, and an electrical sterilizing lamp mounted in said mouth piece in a position such that rays emanating therefrom are projected upon said handle.

4. The structure of claim 3 in which the plane of the receiving face of said ear piece also converges toward said handle and thus exposing said receiving face to the rays of said lamp so that the rays are projected upon said receiving face of said ear piece as well as upon said handle.

5. In combination with a wall telephone box of the type having a hook on a vertical wall thereof for receiving a handset, a handset having a handle with ear and mouth pieces at its opposite ends, the planes of the mouth of said mouth piece and the receiving face of the ear piece each converging toward said handle and each forming an acute angle with said wall of the telephone box when the handset is hung on the hook, and an electrical sterilizing lamp mounted on one of said pieces in such a position that rays emanating therefrom are projected on both the mouth and said receiving face.

6. Structure according to claim 1, said sterilizing lamp having a toroidal shape and being mounted so as to surround the face of the mouth piece in a position axially offset therefrom.

References Cited in the file of this patent

UNITED STATES PATENTS

| | | |
|---|---|---|
| 663,995 | Lacey | Dec. 18, 1900 |
| 1,341,280 | Pape | May 25, 1920 |
| 1,955,972 | Muse | Apr. 24, 1934 |
| 2,485,574 | Deakin | Oct. 25, 1949 |
| 2,697,173 | Balakofsky | Dec. 14, 1954 |
| 2,911,488 | Quintas | Nov. 3, 1959 |